Feb. 19, 1963     I. P. DENYSSEN     3,078,431

STRAIN GAGE AND METHOD OF MANUFACTURE

Filed July 8, 1959

INVENTOR

IVANHOE P. DENYSSEN

BY *Raymond Whotton*

ATTORNEY

United States Patent Office 3,078,431
Patented Feb. 19, 1963

3,078,431
STRAIN GAGE AND METHOD OF MANUFACTURE
Ivanhoe P. Denyssen, 71 Lawrence Park Crescent, Bronxville, N.Y.
Filed July 8, 1959, Ser. No. 825,683
10 Claims. (Cl. 338—2)

This invention relates to strain gages and methods of manufacturing such gages and is particularly directed to gages of the resistance bonded type.

Heretofore such gages have been produced by etching or plating or by the use of fine wire, none of which produces a desirable degree of uniformity of resistance.

It has been found in accordance with the present invention that by rolling metals or their alloys, very thin sheets of uniform thickness can be obtained. By superimposing and bonding such very thin sheets upon sheets of insulating material which are also thin but of sufficient thickness to be self supporting, and then punching grids from such composite bodies, higher and more constant gage factors can be achieved than has been possible heretofore with gages of this general type. The uniformity is so high in fact, that any number of such gages can be switched selectively to a common measuring instrument without requiring calibration or correction. Where a gage produced in this manner has its resistance measured in a Wheatstone bridge, the standard leg of the bridge can contain a gage produced in the same manner without any need for calibration. Moreover, this method of producing gages by punching from laminated sheet stock provides a very economical procedure as compared with those currently in use.

The method of manufacturing a strain gage conforming with the objects of the present invention comprises superimposing and bonding a sheet of metal having a uniform thickness less than 0.0005 inch on a self supporting sheet of insulating material to form a laminated body, punching a grid from the body, and bonding the grid to a continuous base sheet which can in turn be bonded to the test piece undergoing study. The metal sheet preferably has a thickness in the range of from 0.0001 inch to 0.0004 inch. The base sheet is preferably formed of insulating material and the self supporting sheet preferably has a thickness in the range of from 0.002 inch to 0.003 inch although highly desirable results have been achieved with self supporting sheets having a thickness in the range of from 0.001 inch to 0.004 inch.

The strain gage itself conforming to the objects of the present invention comprises a grid of zigzag configuration having a conductive layer of uniform thickness less than 0.0005 inch bonded to a non-conductive self supporting layer of substantially greater thickness, the grid including parallel conductive strips of a width substantially greater than the thickness of the conductive layer. This grid is preferably bonded to a continuous base of sheet material, the self supporting layer preferably having a thickness in the range of from 0.001 inch to 0.004 inch. The conductive layer is preferably a metallic alloy but it is within the scope of the present invention to employ metallic elements.

A more complete understanding of the invention will follow from a description of the accompanying drawings wherein.

Figure 1:
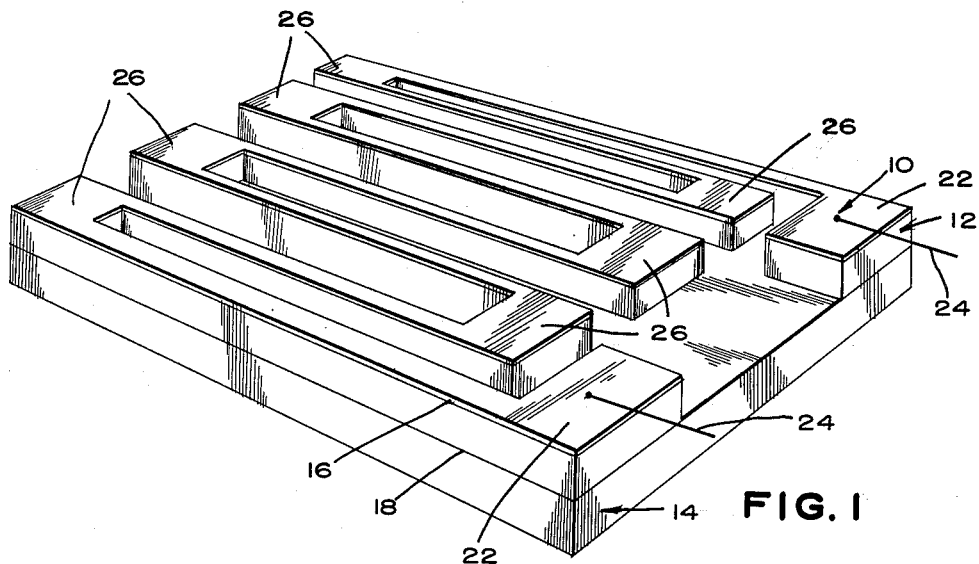
FIG. 1 is a perspective view on a somewhat exaggerated scale depicting a strain gage in accordance with the present invention.
Figure 2:
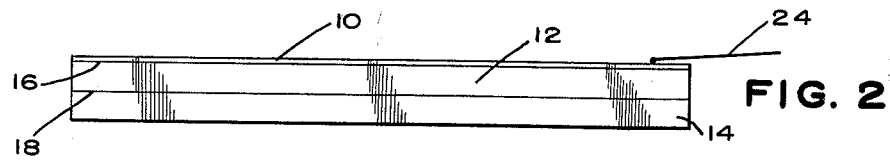
FIG. 2 is a side elevation on a different scale.

A sheet of metal or resistance alloy such as Nichrome, Advance, or Constantan, among others, will be reduced to a uniform thickness less than 0.0005 inch which may fall in the range of from 0.0001 inch to 0.0004 inch. Let us assume for purposes of discussion that the thickness is 0.0002 inch. A sheet of metal of such thickness is much too thin to be self supporting and practically impossible to work. Accordingly, a sheet of this thickness will be superimposed upon and bonded to a sheet of insulating material such as paper, which is of sufficient thickness to be self supporting, but no thicker than necessary. A thickness range for the self supporting sheet may fall in the range of from 0.001 inch to 0.004 inch. Epoxy resins, Bakelite cements and other well known and readily available materials may be employed to effect this bonding. The laminated body thus formed is then punched to form a grid such as that depicted in FIG. 1 wherein the metallic layer 10 is bonded to the insulating layer 12 and the entire grid bonded to a continuous sheet of paper or other suitable insulating material 14.

Figure 3:
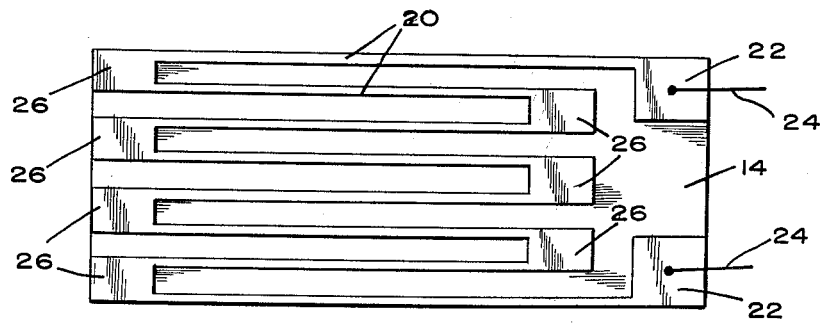
FIG. 3 is a plan view of one of the products contemplated.

The bonding material 16 is introduced between the metallic sheet 10 and the self supporting sheet 12 and the bonding material 18 is introduced between the self supporting sheet 12 and the base sheet 14. Where the thickness of the metallic sheet is of the order of 0.0002 inch as assumed above, the width of the parallel strips formed by the punching operation may be 0.006 inch at their intermediate portions 20 as indicated in FIG. 3. The outermost parallel strips have unconnected ends 22 which are enlarged to provide terminals for the attachment of leads 24. These terminals, as viewed in FIG. 3 may have an axial dimension of 0.06 inch and a transverse dimension of 0.05 inch. Each of the parallel strips 20 is joined to its adjacent strip by an enlarged connecting portion 26 whose axial dimension may be 0.05 inch and whose transverse dimension may be 0.032 inch. The lengths of the parallel strips between their enlarged connecting portions in the example assumed for purposes of description may be of the order of 0.125 to 1.0 inch.

The leads 24 may be welded to the terminals 22. The base sheet 14 may be applied to the self supporting insulating sheet 12 or if desired, it may be applied to the metallic surface. Similarly, the self supporting insulating sheet 12 may receive metallic sheets 10 on opposite surfaces, the metallic sheets being connected to one another or not, depending upon the uses contemplated for the gages.

The thickness of the metallic sheet 10 may be reduced to approach a molecular thickness in accordance with the present invention since the mechanical strength of the metallic sheet is not relied upon for handling the completed gage.

Since a punching operation can be made to reproduce the articles almost identically, the need for calibration is for the most part eliminated and very low tolerances can be met uniformly and in large quantities.

Although only one example of the present invention has been described with respect to the accompanying drawings, the variations suggested thereby to those skilled in the art are contemplated by the appended claims.

I claim:

1. A method of manufacturing a strain gage comprising superimposing and bonding a sheet of metal having a uniform thickness less than 0.0005 inch on a self supporting sheet of insulating material to form a laminated body, and thereafter punching a grid from said body through said metal and self supporting sheets, and bonding said grid to a continuous base sheet.

2. A method of manufacturing a strain gage as set forth in claim 1 wherein said metal sheet has a thickness in the range of from 0.0001 inch to 0.0004 inch.

3. A method of manufacturing a strain gage as set forth in claim 1 wherein said base sheet is formed of insulating material.

4. A method of manufacturing a strain gage as set forth in claim 1 wherein said self supporting sheet has a thickness in the range of from 0.002 inch to 0.003 inch.

5. A method of manufacturing a strain gage as set forth in claim 1 wherein said self supporting sheet has a thickness in the range of from 0.001 inch to 0.004 inch.

6. A strain gage comprising a laminated grid of zigzag configuration, uniform throughout its thickness, having a conductive layer of uniform thickness less than 0.0005 inch bonded to a non-conductive self supporting layer of substantially greater thickness, said laminated grid including parallel laminated strips having conductive layers of a width substantially greater than their thickness.

7. A strain gage as set forth in claim 6 wherein said grid is bonded to a continuous base of sheet material.

8. A strain gage as set forth in claim 6 wherein said self supporting layer has a thickness in the range of from 0.001 inch to 0.004 inch.

9. A strain gage as set forth in claim 6 wherein said conductive layer is a metal.

10. A strain gage as set forth in claim 6 wherein said conductive layer is a metallic alloy.

References Cited in the file of this patent

UNITED STATES PATENTS

| | | |
|---|---|---|
| 2,457,616 | Van Dyke | Dec. 28, 1948 |
| 2,662,957 | Eisler | Dec. 15, 1953 |
| 2,899,658 | Bean | Aug. 11, 1959 |